(12) United States Patent
Lambert

(10) Patent No.: US 10,702,840 B2
(45) Date of Patent: Jul. 7, 2020

(54) FIXED BED OR MOVING BED REACTORS WITH A RADIAL FLOW OF PROCESS STREAM TO BE TREATED, COMPRISING IMPROVED INTERNALS

(71) Applicant: AXENS, Rueil Malmaison (FR)

(72) Inventor: Fabian Lambert, Chatou (FR)

(73) Assignee: AXENS, Rueil Malmaison (FR)

( * ) Notice: Subject to any disclaimer, the term of this patent is extended or adjusted under 35 U.S.C. 154(b) by 48 days.

(21) Appl. No.: 16/012,905

(22) Filed: Jun. 20, 2018

(65) Prior Publication Data

US 2018/0369774 A1    Dec. 27, 2018

(30) Foreign Application Priority Data

Jun. 21, 2017 (FR) ..................................... 17 55653

(51) Int. Cl.
*B01J 8/02* (2006.01)
*B01J 8/08* (2006.01)
(Continued)

(52) U.S. Cl.
CPC ............. *B01J 8/085* (2013.01); *B01J 8/0015* (2013.01); *B01J 8/0207* (2013.01); *B01J 8/0214* (2013.01); *B01J 8/0278* (2013.01); *B01J 8/12* (2013.01); *B01J 2208/0092* (2013.01); *B01J 2208/00752* (2013.01); *B01J 2208/00884* (2013.01); *B01J 2208/00938* (2013.01)

(58) Field of Classification Search
CPC ... B01J 8/00; B01J 8/0015; B01J 8/008; B01J 8/02; B01J 8/0207; B01J 8/0214; B01J 8/0278; B01J 8/08; B01J 8/085; B01J 8/12; B01J 2208/00743; B01J 2208/00752; B01J 2208/00796; B01J 2208/00823; B01J 2208/00831; B01J 2208/00884; B01J 2208/00893; B01J 2208/0092; B01J 2208/00938; C01C 1/00; C01C 1/02; C01C 1/04; C01C 1/0405; C01C 1/0417; C01C 1/0429; C10G 35/00; C10G 35/04; C10G 35/10; C10G 35/12; C10G 45/00; C10G 45/58; C10G 45/66

See application file for complete search history.

(56) References Cited

U.S. PATENT DOCUMENTS 4,277,444 A * 7/1981 Van Landeghem ...... B01J 8/003
                                                422/634
7,214,352 B2   5/2007 Poussin
(Continued)

FOREIGN PATENT DOCUMENTS

FR    2836841 A1   9/2003
FR    3017806 A1   8/2015

OTHER PUBLICATIONS

Search Report dated Feb. 19, 2018 issued in corresponding FR 1755653 application (2 pages).

*Primary Examiner* — Natasha E Young
(74) *Attorney, Agent, or Firm* — Millen, White, Zelano and Branigan, P.C.

(57) ABSTRACT

The present invention concerns reactors with a radial flow of process stream to be treated comprising improved internals which can be used to minimize the catalytic zones which do not receive any of the process stream which is to be treated. The invention also concerns the use of these radial flow reactors in refining or petrochemical processes.

15 Claims, 6 Drawing Sheets

(51) Int. Cl.
*B01J 8/12* (2006.01)
*B01J 8/00* (2006.01)

(56) References Cited

U.S. PATENT DOCUMENTS

| | | |
|---|---|---|
| 7,749,467 B2 | 7/2010 | Naunheimer et al. |
| 2003/0219365 A1 | 11/2003 | Poussin |
| 2009/0154632 A1 | 6/2009 | Naunheimer et al. |
| 2017/0014791 A1 | 1/2017 | Lambert |

* cited by examiner

FIXED BED OR MOVING BED REACTORS WITH A RADIAL FLOW OF PROCESS STREAM TO BE TREATED, COMPRISING IMPROVED INTERNALS

This application claims priority to French Patent Application Serial No. FR1755653, filed on Jun. 21, 2017.

CONTEXT OF THE INVENTION

The invention relates to reactor internals for processes operated with reactors having a radial flow of process stream to be treated (also known as the feed in the remainder of the description), such as, for example, the catalytic reforming of gasolines or the production of aromatics such as BTX (abbreviation of Benzene, Toluene and Xylenes). The term "radial flow of feed" means that the flow of feed is substantially horizontal through a catalytic bed. Reactors with a radial flow of feed include moving bed reactors and fixed bed reactors. The present invention is equally applicable to moving bed reactors and to fixed bed reactors.

The term "moving bed" means that the entirety of the catalyst, dispersed in the form of small particles, flows substantially vertically under the effect of gravity. This type of moving bed flow is encountered in particular in processes comprising continuous regeneration of a catalyst, such as the continuous reforming of gasolines. The present invention is also applicable to fixed bed reactors such as in the hydroalkylation of aromatics, the isomerization of xylenes, etc.

The invention consists of improving the internals of radial flow reactors of the moving bed or fixed bed type, by increasing the volume of catalyst brought into contact with the feed to be treated with respect to the total volume of catalyst present in the reactor.

In accordance with the present invention, for an equivalent performance, the reactor volume is thus reduced or, from another viewpoint, for the same volume of reactor, the quantity of catalyst available for the reaction is greater.

EXAMINATION OF THE PRIOR ART

The U.S. Pat. No. 6,221,320 summarizes conventional moving bed technologies.

In accordance with the prior art, in the case of moving bed radial reactors, the zone located below the support ring for the outer screen and at the outside of the inner screen contains a certain volume of catalyst which does not receive any process stream to be treated. Thus, it constitutes a dead volume in the sense that it is not active in the reaction.

In other prior art cases, in the case of radial fixed bed reactors, the zone located below the support ring for the outer screen and outside the inner screen does not contain catalyst. Furthermore, the head zone of the reactor also does not contain catalyst.

Figure 2:
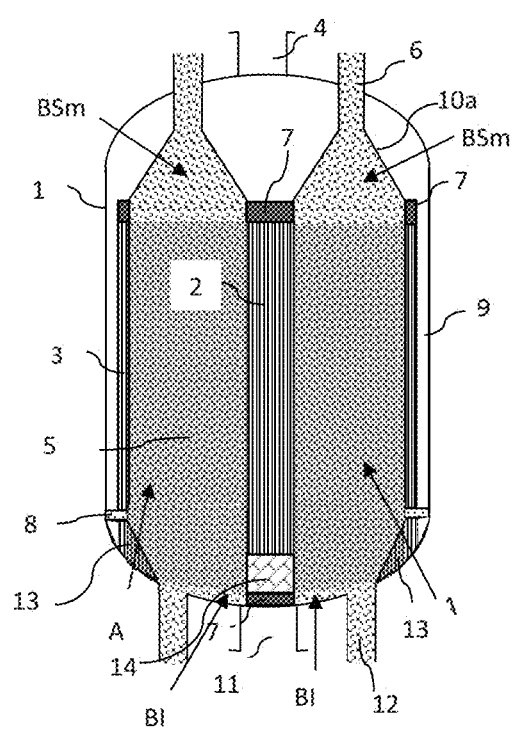
FIG. 2 is a diagrammatic view of a moving bed and radial flow reactor in accordance with an embodiment of the present invention.

Moreover, in accordance with the prior art, at the head of radial moving bed reactors, the progressive introduction of catalyst is carried out via a plurality of conduits, each generally being constituted by a plurality of elements, and being terminated by a conical portion centred on the middle of the catalytic bed. This conical portion is what distributes the catalyst in the annular catalytic zone located between the outer screen and the inner screen, all around the reactor. Said conical portions are located in the uppermost portion of the catalytic bed, the zone in which the outer screen comprises a piece of solid plate, as illustrated in FIG. 2 of U.S. Pat. No. 7,749,467 B2, in the case of a modular outer screen. On the other hand, the upper portion of the inner screen also comprises a solid plate, as can also be seen in said FIG. 2. As a consequence, the zone located between these two solid plates contains catalyst which is not brought into contact with the process stream to be treated.

The U.S. Pat. Nos. 3,864,240, 4,040,794 and FR 2 160 269 describe different types of moving bed reactors which may in particular be used in a process for the catalytic reforming of gasolines. In that type of process, the catalyst moves in the various reactors of the reaction section, generally three, four or perhaps five in number, by being brought to the head of the reactor in the series from the bottom of the preceding reactor by means of a "lift" transport system. It is then brought to the head of the regenerator, then the regenerated catalyst is returned to the reaction section.

Figure 1:
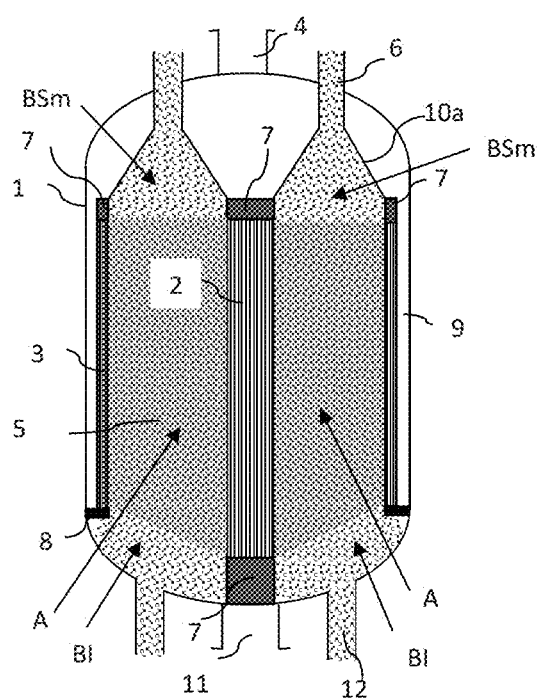
FIG. 1 is a diagrammatic view of a moving bed and radial flow reactor in accordance with the prior art.

In accordance with other variations of the prior art (U.S. Pat. No. 3,706,536), the various catalytic zones are stacked up (it is then known as a "stacked reactor") so that just one single reactor is formed comprising the various reaction sections between which the catalyst moves. It is also possible to associate a reactor comprising a plurality of stacked reaction sections with one or more other reactors comprising one or more reaction sections, as illustrated in FIG. 1 of patent FR 2 160 269.

By employing certain adaptations which can be accessed by the person skilled in the art, the present invention concerns both the reaction zones of separate reactors and stacked reaction zones, or a combination of the two modes.

U.S. Pat. No. 6,221,320 describes a technology in which the inner screen and the outer screen are replaced by an equivalent device constituted by a plurality of catalyst receptacles or modules wherein each one is a segment of a cylinder divided in the axial plane (a device known as a "catalyst container"). Said modules are constituted by Johnson screens. The present invention may be applied both to embodiments with an inner screen and an outer screen and to embodiments using a device of the type described in the U.S. Pat. No. 6,221,320.

The present invention also concerns reactors for recovering heat inside a reactor, such as those described in the patent EP 2 225 016.

Patent application FR 2014/51613 describes a catalytic moving bed reactor in which the catalyst is enclosed in moving baskets provided with a flap installed in the lower portion of said baskets.

The present invention also concerns the reactor described in that patent. In fact, it is entirely possible to conceptualize flaps which are permeable to the reaction stream.

Patent application FR 2016/55251 describes a reactor in which the catalyst is contained in the reactor envelope and the gas is distributed through multiple vertical cylindrical distributors. The present invention is also applicable to that type of reactor.

DESCRIPTION OF THE INVENTION

The present invention concerns internals of reactors with a radial flow of the process stream to be treated. Preferably, these reactors operate with a moving bed or fixed bed of catalyst and are generally termed fixed bed reactors or moving bed reactors.

More precisely, the present invention concerns a reactor with a radial flow of process stream to be treated from an outer screen 3 to an inner screen 2, or conversely from an inner screen 2 to an outer screen 3, in which reactor at least one of the zones containing catalyst which are not reached by the process stream to be treated (termed dead zones) has a volume which is reduced to a minimum, i.e.:

the lower zone BI located between the lower end of the outer screen 3 and the lower end of the inner screen 2 on the one hand and the bottom of the reactor on the other hand, and when the reactor is a moving bed reactor, the upper zone BSm located between the diplegs 6 for introducing catalyst into the reactor at the level of the shell and the upper end of the outer 3 and inner 2 screens, or the lower end of the solid plates 7.

In the case of a fixed bed reactor, the zones BI and BSf generally do not contain catalyst and are empty of any solid, or are at least partially filled with a material which is catalytically inert. In particular, the zone BI is preferably at least partially filled with an inert solid and the zone BSf is preferably empty and is located between the head of the reactor and the solid plate 17 which isolates the upper portion from the catalytic bed. These zones may potentially be at least partially filled with catalyst without, however, constituting dead zones, because of the improved internals of the reactor in accordance with the invention.

The reactor in accordance with the invention comprises at least one supplemental outer screen 13, 18 having a shape which is adapted to that of the bottom of the reactor or the head of the reactor, said supplemental screen 13, 18 being located in the extension of the outer screen 3.

The term "adapted shape" means that the shape of the supplemental outer screen moulds as perfectly as possible to the shape of the shell of the reactor in the zone of the reactor where it is disposed.

The expression "in the extension of the outer screen 3" means that the supplemental outer screen is either located in the direct extension of the outer screen 3 (FIG. 6), i.e. the supplemental outer screen forms an extension of the outer screen 3, or located just below the support for the outer screen 3 when the latter is present (FIG. 2).

More precisely, the invention concerns a reactor with a radial flow of process stream to be treated, comprising a shell 5, means for introducing process stream to be treated 4 and for effluents 11 to be removed, a zone for distributing said process stream 9, optional diplegs 6 for introducing catalyst, outer screens 3 and inner screens 2 to enable the process stream to be treated to move from an outer screen 3 to an inner screen 2 located substantially at the centre of the reactor, in which said reactor comprises at least one supplemental outer screen 13, 18 having a shape which is adapted to that of the bottom of the reactor or the head of the reactor, said supplemental screen 13, 18 being located in the extension of the outer screen 3. The context of the present invention encompasses the case in which the process stream to be treated moves from the inner screen 2 to the outer screen 3.

In fact, in a radial flow reactor, the lower portion of the outer screen 3 rests on a support, preferably a support ring 8a; said support is preferably perforated in order to allow the process stream to be treated to pass through.

However, it is occasionally possible to fix the outer screen 3 and the supplemental outer screen 13 via different means: suspending the outer screens 3 and 13 in the reactor or fixing them to the shell, for example via any fixing means, for example bolted or welded, known to the person skilled in the art. Said outer screen 3 and supplemental outer screen 13 may optionally be joined by welding or bolting, or by any other means known to the person skilled in the art, or in fact be fabricated in a single piece.

By means of the reactor in accordance with the invention, at least one of said dead zones BI or BSm, BSf has a residual volume VR (volume which is defined as the volume not reached by the process stream to be treated) which is below 50% of the total volume VT of said zone in that same reactor. Preferably, said residual volume VR remains in the range 1% to 45% of the volume VT, more preferably in the range 2% to 30% of the volume VT, and more preferably in the range 2% to 15% of the volume VT.

In accordance with one or more embodiments of the reactor in accordance with the invention, the lower portion of the surface of the inner screen 2 comprises one or more pieces 7 of solid plate, and a perforated plate comprising a specific perforation zone 14, i.e. with perforations which differ from those of the remainder of the inner screen 2.

In accordance with one or more embodiments, the upper portion of the surface of the inner screen 2 comprises one or more pieces 7 of solid plate, and a perforated plate comprising a specific perforation zone 14, i.e. with perforations which differ from those of the remainder of the inner screen 2.

In accordance with one or more embodiments, the outer screen 3 is composed of contiguous modules, each of the modules being extended into the bottom of the reactor in a manner such as to constitute a screen which is adapted to the bottom of the reactor. Preferably, said contiguous modules are composed of a plurality of assembled pieces.

Preferably, the reactor in accordance with the invention is a moving bed reactor. This means that the catalyst moves in the reactor in accordance with the invention, preferably from the top to the bottom of the reactor in gravity flow mode; a reverse movement of catalyst is also possible, however.

In accordance with one or more embodiments of a moving bed reactor in accordance with the invention, the series of pipes for introducing catalyst 6 discharges into an annular zone with a trapezoidal section BSm in which the catalyst is brought into partial contact with the process stream to be treated, the geometry of said trapezoidal section being such that the outer screen 3 is extended upwards and does not comprise a solid plate portion.

In accordance with one or more embodiments of a moving bed reactor in accordance with the present invention, a solid plate inclined at an angle $\theta$ with respect to the horizontal, the angle $\theta$ being greater than the angle of repose, delimits the annular catalytic zone above the inner screen 2. Preferably, the upper portion of the inner screen 2 is provided with a perforated plate comprising, in its upper portion, a specific perforation zone 14 with perforations which differ from those of the remainder of the inner screen 2.

In accordance with one or more embodiments of the invention, the reactor in accordance with the invention is a fixed bed reactor, i.e. the catalyst is immobilized in a bed inside the reactor.

In a fixed bed reactor with a radial flow of process stream to be treated in accordance with the invention, said catalyst is generally disposed between an outer screen 3 located at the periphery of the reactor and an inner screen 2 located substantially at the centre of the reactor.

Preferably, the bed of catalyst is located between a substantially horizontal solid plate 17 which isolates the upper portion of the catalytic bed of the head of the reactor, and a bed of inert beads which fills the bottom of the reactor.

In the case of a fixed bed reactor, as was the case for the other types of reactors in accordance with the invention, said reactor comprises a supplemental outer screen 13 which is adapted to the bottom of the reactor, said screen being located in the extension of the outer screen 3.

Furthermore, in accordance with one or more embodiments, a second supplemental outer screen 18 may be added above the outer screen 3 and in its extension. The shape of said screen 18 is preferably adapted to that of the head of the reactor, in particular when at least part of said screen is positioned in the curved portion of the shell. This second supplemental screen 18 is preferably installed when a fixed bed reactor is used.

The present invention also concerns the use of the radial flow reactors in accordance with the invention in refining or petrochemical processes preferably selected from the following processes: the continuous reforming of gasolines, the skeletal isomerization of gasolines, the metathesis of olefins, oligocracking, the dehydrogenation of paraffins or aromatics, and the ammonia production process.

DETAILED DESCRIPTION OF THE FIGURES

FIG. 1 represents a radial moving bed reactor provided with internals in accordance with the prior art. The process stream to be treated, i.e. the feed, is introduced via the pipe 4 of the reactor and is distributed into the distribution zone 9 for the process stream located between the external envelope or shell 1, i.e. the wall of the reactor, and the outer screen 3, said outer screen 3 being constituted by a one-piece device constituting a continuous cylinder which is known as the outer basket.

The catalyst is introduced into the top of the reactor via a series of pipes 6, each discharging into a central conical portion BSm defined by the cones 10a at the end of the pipes 6 and over the middle of the catalytic bed to enable the catalyst to be distributed over the entre annular catalytic zone 5 which is located between the outer screen 3 and the inner screen 2. The centred conical portions BSm are constituted by pieces of solid plates. The vertical axis of the conical portions passes through the middle of the catalytic bed. Preferably, the cone angle with respect to a horizontal line should be greater than the angle of repose.

Said conical portions BSm terminate in the highest portion of the catalytic bed 5. In this highest portion of the catalytic bed, the outer screen comprises pieces 7 of solid plate.

The process stream to be treated passes through the catalytic bed in a substantially horizontal manner and perpendicular to the catalyst which moves under gravity, i.e. substantially vertically. At the outlet from the catalytic bed 5, the treated process stream is collected in the central conduit or inner screen 2 and leaves the reactor via the pipe 11.

The lower portion of the outer screen 3 rests on a solid support ring 8 welded to the envelope of the reactor 1. In general, it is fixed by removable fixing means, for example keys or bolts, or by tack welding.

In general, the inner screen 2 rests on a support ring (not shown) welded to the bottom of the reactor at the periphery of the outlet pipe for the treated process stream 11. In general, it is fixed by means of removable fixing means, for example keys or bolts, or by tack welding. In this lowest portion of the catalytic bed 5, the inner screen 2 comprises at least one piece 7 of solid plate.

The catalyst flows gradually under gravity from the top to the bottom of the catalytic zone. Typically, the catalyst is withdrawn from the bottom, by means of one or more outlet pipes 12. A lift can be used to transport the withdrawn catalyst to the upper portion of the catalytic zone of the next reactor or to the regenerator located after the last reactor by means of a working fluid, for example a gas, preferably hydrogen.

FIG. 2 shows a radial bed reactor operated in moving bed mode, provided with improved internals in accordance with one of the preferred embodiments of the present invention. The entire upper portion of the reactor, i.e. the conical portions BSm formed from solid plates and the solid pieces of the upper end of the outer screen 3, is identical to that of the reactor shown in FIG. 1.

In accordance with one or more embodiments, the lower portion of the outer screen 3 rests on a perforated support ring 8a which allows the process stream to be treated to pass through. As an example, the support ring is provided with orifices at regular intervals, or it might be discontinuous. Below the perforated support ring, compared with the prior art, an outer screen adapted to the bottom of the reactor 13 has been added.

In accordance with one or more embodiments, in the bottom of the reactor, the surface of the inner screen 2 comprising one or more pieces 7 of solid plate is minimized compared with FIG. 1.

In addition, in contrast to the arrangement presented in FIG. 1, the lower portion of the inner screen 2 may advantageously have a perforated plate comprising, in its lower portion, a specific perforation zone 14 with different perforations from that of the remainder of the screen.

Compared with FIG. 1, the arrangement in accordance with the embodiment presented in FIG. 2 can be used to reduce the volume of the zones BI in the bottom of the reactor, said zones being in the reactor vessel and comprising catalyst, without the process stream to be treated passing through it. This means that these zones BI, which are ineffective from the point of view of the chemical reaction (dead zones) in the prior art, become at least partially effective in the reactor in accordance with the invention. The fact of reducing the volume of the dead zones brings about an overall increase in the efficiency of the reactor.

Figure 3:
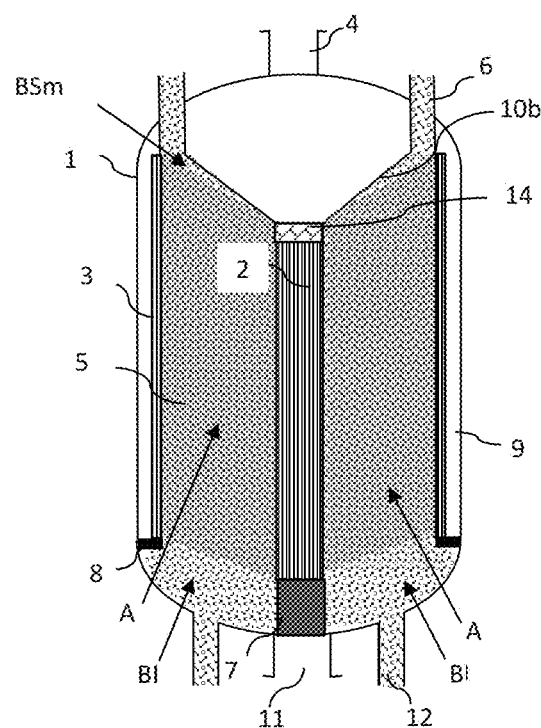
FIG. 3 is a diagrammatic view of a moving bed and radial flow reactor in accordance with an embodiment of the present invention.

FIG. 3 represents a radial bed reactor operated in moving bed mode, provided with improved internals in accordance with a preferred embodiment of the invention. The entire lower portion of the reactor, i.e. the support ring 8 and the inner screen 2 comprising at least one piece 7 of solid plate in its lower portion, is identical to that of the reactor represented in FIG. 1.

The catalyst is introduced into the top of the reactor via a series of pipes 6 opening into an annular zone with a trapezoidal section BSm in which the catalyst is brought into partial contact with the process stream to be treated. The pipes 6 may advantageously comprise a conical portion so that the catalyst can be distributed over the whole of the annular catalytic zone. In contrast to FIG. 1, the geometry of the trapezoidal section is such that the outer screen 3 is extended upwards compared with FIG. 1, and does not include a solid plate portion.

The upper end of the outer screen 3 is located above the upper end of the inner screen 2. A solid plate inclined at an angle θ with respect to the horizontal which is greater than the angle of repose delimits the annular catalytic zone above the inner screen 2. In contrast to the arrangement presented in FIG. 1, the upper portion of the inner screen 2 may advantageously have a perforated plate comprising, in its upper portion, a specific perforation zone 14 with perforations which differ from the remainder of the screen.

Compared with FIG. 1 and FIG. 2, the arrangement in accordance with the embodiment of the invention presented in FIG. 3 can be used to reduce the zones BSm at the head of the reactor, said zones being in the vessel of the reactor and comprising catalyst, without the process stream to be treated passing through them in the reactor of the prior art (FIG. 1), the zones BSm thus being ineffective zones from the point of view of the chemical reaction. The fact of reducing the volume of the dead zones brings about an overall increase in the efficiency of the reactor.

Figure 4:
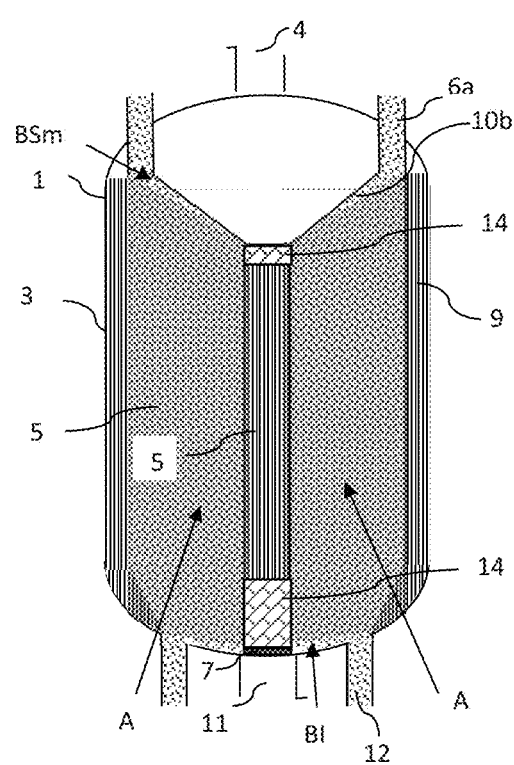
FIG. 4 is a diagrammatic view of a moving bed and radial flow reactor in accordance with an embodiment of the present invention.

FIG. 4 represents a radial moving bed reactor provided with improved internals in accordance with a preferred embodiment of the invention.

In accordance with one or more embodiments, the outer screen 3 is composed of contiguous outer modules, each of the modules being extended to the bottom and/or the head of the reactor in a manner such as to constitute a screen which is adapted to the bottom and/or to the head of the reactor. The contiguous modules may be composed of a plurality of assembled pieces or they may be in one piece. They are preferably composed of assembled pieces.

The catalyst is introduced into the top of the reactor via a series of pipes 6 discharging into the annular zone with a trapezoidal section 10*b* similar to that of FIG. 3.

In contrast to the arrangement presented in FIG. 1, the lower and upper portions of the inner screen may advantageously have a perforated plate comprising, in its lower portion and/or in its upper portion, specific perforation zones 14 with perforations which differ from that of the remainder of the screen.

Compared with FIG. 1, the arrangement in accordance with the embodiment of the invention presented in FIG. 4 can be used to reduce the volumes of the zones BSm and BI at the head and bottom of the reactor which are ineffective (dead zones).

Figure 5:
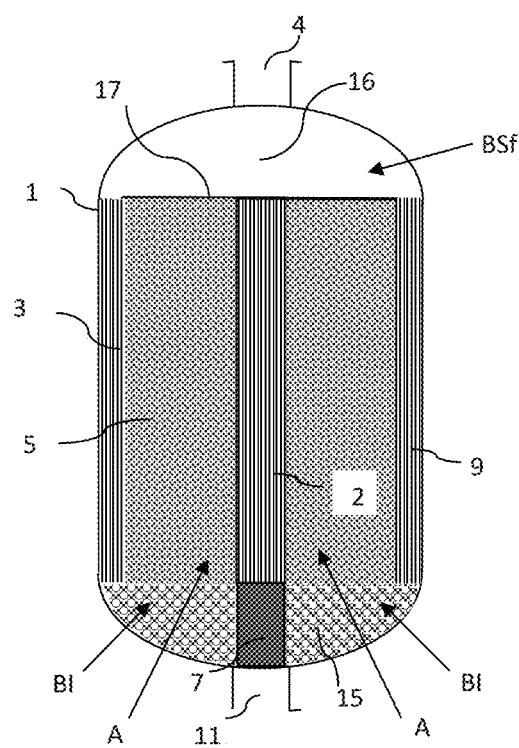
FIG. 5 is a diagrammatic view of a fixed bed and radial flow reactor in accordance with the prior art.

FIG. 5 represents a radial reactor operated in fixed bed mode in accordance with the prior art.

The process stream to be treated, i.e. the feed, is introduced via the pipe 4 of the reactor and is distributed into the head of the reactor 16 then into the process stream distribution zone 9 located between the external envelope or shell 1 and the outer screen 3, said outer screen being constituted by a plurality of contiguous modules suspended in the reactor.

The bed of catalyst is located between the solid plate 7 which isolates the upper portion of the catalytic bed from the head of the reactor, which is generally located at the level of the tangential line of the reactor, and a bed of inert beads which fills the bottom of the reactor, generally from the lower tangential line.

The process stream to be treated passes through the catalytic bed in a manner which is substantially horizontal and is perpendicular to the bed of catalyst 5. At the outlet from the catalytic bed, the treated process stream is collected in the central conduit or inner screen 2 and leaves the reactor via the pipe 11.

The inner screen 2 generally rests on a welded support ring (not shown) in the bottom of the reactor at the periphery of the outlet pipe for the treated process stream 11. In this portion, which is the lowest portion of the catalytic bed, the inner screen 2 comprises at least one solid plate piece 7.

The catalytic zone through which the process stream to be treated is passed is shown as the greyed zone A.

Figure 6:
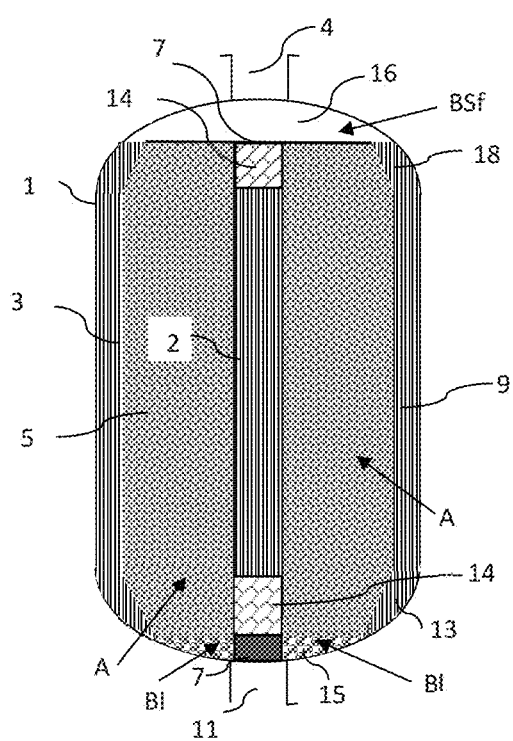
FIG. 6 is a diagrammatic view of a fixed bed and radial flow reactor in accordance with an embodiment of the present invention.

FIG. 6 represents a radial bed reactor operated in fixed bed mode, provided with improved internals in accordance with a preferred embodiment of the invention.

In accordance with one or more embodiments, the outer screen 3 is composed of contiguous external modules, each of the modules being extended into the bottom and/or into the head of the reactor in a manner such as to constitute a screen which is adapted at the bottom and/or the head. The contiguous modules may be composed of a plurality of assembled pieces or by a single piece. They are preferably composed of assembled pieces.

Compared with FIG. 5, the upper portion of the catalytic bed penetrates into the head of the reactor and the lower portion of the catalytic bed penetrates into the bottom. The height of the bed of inert beads located in the bottom of the reactor is reduced compared with FIG. 1, and hence the volume of the dead zones BI and BSf is reduced, and the reactor efficiency is increased.

In contrast to the arrangement presented in FIG. 5, the lower and upper portions of the inner screen 2 may advantageously have a perforated plate comprising, in its lower portion and/or in its upper portion, specific perforation zones 14 with perforations which differ from those of the remainder of the screen.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. FR 1755653, filed Jun. 21, 2017 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactor with a radial flow of process stream to be treated, comprising a shell (5), means for introducing process stream to be treated (4) and for effluents (11) to be removed, a zone for distributing said process stream (9), optional diplegs (6) for introducing catalyst, outer screens (3) and inner screens (2) to enable the process stream which is to be treated to move from an outer screen (3) to an inner screen (2) located substantially at the centre of the reactor, or conversely from the inner screen (2) to the outer screen (3), wherein said reactor further comprises at least one supplemental outer screen (13, 18) having a shape which is adapted to that of the bottom of the reactor or the head of the reactor, said supplemental screen (13, 18) being located in the extension of the outer screen (3).

2. The reactor as claimed in claim 1, wherein the lower portion of the outer screen (3) rests on a support.

3. The reactor as claimed in claim 2, wherein said support is perforated in order to allow the process stream to be treated to pass through.

4. The reactor according to claim 2, wherein the lower portion of the outer screen (3) rests on a support ring (8a).

5. The reactor as claimed in claim 1, wherein the lower portion of the surface of the inner screen (2) comprises one or more pieces (7) of solid plate, and a perforated plate comprising a zone with specific perforations (14) which differ from those of the remainder of the inner screen (2).

6. The reactor as claimed in claim 1, wherein the upper portion of the surface of the inner screen (2) comprises one or more pieces (7) of solid plate, and a perforated plate comprising a zone with specific perforations (14) which differ from those of the remainder of the inner screen (2).

7. The reactor as claimed in claim 1, wherein the outer screen (3) is composed of contiguous modules resting on a support ring or being suspended, each of the modules being extended into the bottom of the reactor in a manner forming a screen which is adapted to the bottom of the reactor.

8. The reactor as claimed in claim 7, wherein said contiguous modules are composed of a plurality of assembled pieces.

9. The reactor as claimed in claim 1, wherein said reactor is a moving bed reactor.

10. The moving bed reactor as claimed in claim 9, wherein the series of pipes for introducing catalyst (6) discharges into an annular zone with a trapezoidal section (BSm) in which the catalyst is brought into partial contact with the process stream to be treated, the geometry of said trapezoidal section being such that the outer screen (3) is extended upwards and does not comprise a solid plate portion.

11. The moving bed reactor as claimed in claim 9, wherein a solid plate inclined at an angle $\theta$ with respect to the horizontal, the angle $\theta$ being greater than the angle of repose, delimits the annular catalytic zone above the inner screen (2).

12. The reactor as claimed in claim 1, wherein said reactor is a fixed bed reactor in which the catalyst is disposed between an outer screen (3) located at the periphery of the reactor and an inner screen (2) located substantially at the centre of the reactor.

13. The fixed bed reactor as claimed in claim 12, wherein the bed of catalyst is located between a substantially horizontal solid plate (17) which isolates the upper portion of the catalytic bed of the head of the reactor, and a bed of inert beads which fills the bottom of the reactor.

14. The fixed bed reactor as claimed in claim 12, wherein a second supplemental outer screen (18) is added above the outer screen (3) and in its extension.

15. A refining or petrochemical process consisting comprising continuous reforming of gasolines, skeletal isomerization of gasolines, olefin metathesis, oligocracking, dehydrogenation of paraffins or aromatics, or ammonia production, comprising subjecting a feed to reaction conditions in a reactor according to claim 1.

* * * * *